United States Patent
Lee et al.

(10) Patent No.: US 9,531,310 B2
(45) Date of Patent: Dec. 27, 2016

(54) SYSTEM AND METHOD FOR COMPUTING MOTOR SPEED AND ROTOR POSITION USING HALL SENSOR

(71) Applicants: Hyundai Motor Company, Seoul (KR); Kia Motors Corporation, Seoul (KR)

(72) Inventors: Dong Hun Lee, Gyeonggi-do (KR); Min Su Kang, Gyeonggi-do (KR); Soon Woo Kwon, Gyeonggi-do (KR); Sung Do Kim, Gyeonggi-do (KR); Joon Yong Lee, Seoul (KR); Chang Seok Ryu, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 14/569,641

(22) Filed: Dec. 13, 2014

(65) Prior Publication Data
US 2016/0094165 A1 Mar. 31, 2016

(30) Foreign Application Priority Data
Sep. 25, 2014 (KR) ........................ 10-2014-0128036

(51) Int. Cl.
*H02P 6/06* (2006.01)
*H02P 6/16* (2016.01)
*H02P 27/08* (2006.01)

(52) U.S. Cl.
CPC ................. *H02P 6/165* (2013.01); *H02P 6/16* (2013.01); *H02P 27/08* (2013.01)

(58) Field of Classification Search
CPC ............... H02P 6/002; H02P 6/16; H02P 6/10; H02P 6/142; H02P 6/18; H02P 6/008; H02P 6/06; H02P 6/085; H02P 6/14; H02P 6/205
USPC ............ 318/400.01, 400.04, 400.06, 400.11, 318/400.17
See application file for complete search history.

(56) References Cited

U.S. PATENT DOCUMENTS

| | | | |
|---|---|---|---|
| 4,868,469 A * | 9/1989 | Chan | G06F 9/30061 318/400.01 |
| 5,193,146 A * | 3/1993 | Kohno | G11B 19/20 318/599 |
| 5,675,094 A * | 10/1997 | Klauber | B60G 17/019 73/862.191 |
| 5,686,672 A * | 11/1997 | Klauber | B60G 17/019 73/114.15 |

(Continued)

FOREIGN PATENT DOCUMENTS

| | | |
|---|---|---|
| JP | 2010-220420 A | 9/2010 |
| JP | 2011-087440 A | 4/2011 |

(Continued)

*Primary Examiner* — Paul Ip
(74) *Attorney, Agent, or Firm* — Mintz Levin Cohn Ferris Glovsky and Popeo, P.C.; Peter F. Corless

(57) ABSTRACT

A method and system for computing a motor speed and a rotor position using a hall sensor are provided. The method improves precision for computing the speed of the motor rotating at a high speed and the rotor position using the hall sensor based on configurations, such as the hall sensor mounted in the motor as a position sensor, a motor controller configured to receive a signal of the hall sensor to operate the motor, and a microcomputer configured to store a time when the motor controller senses the timing of a change in the signal of the hall sensor.

19 Claims, 7 Drawing Sheets

(56) References Cited

U.S. PATENT DOCUMENTS

| | | | | |
|---|---|---|---|---|
| 5,847,523 A * | 12/1998 | Rappenecker | ............ | H02P 6/12 318/400.11 |
| 5,869,752 A * | 2/1999 | Klauber | ................ | B60G 17/019 701/101 |
| 6,933,690 B2 * | 8/2005 | Yamamoto | ................ | H02P 6/16 318/400.04 |
| 6,956,340 B2 * | 10/2005 | Schondelmaier | ......... | H02P 6/14 318/400.01 |
| 7,230,400 B1 * | 6/2007 | Dufner | ..................... | H02P 6/18 318/400.1 |
| 7,259,531 B1 * | 8/2007 | Liu | .......................... | 318/400.38 |
| 7,319,300 B2 * | 1/2008 | Hahn | ..................... | H02P 6/002 318/400.08 |
| 7,443,119 B2 * | 10/2008 | Liu | .......................... | H02P 6/16 318/400.01 |
| 7,525,271 B2 * | 4/2009 | Chen | ........................ | H02P 6/16 318/293 |
| 7,541,760 B2 * | 6/2009 | Lin | .......................... | H02P 6/08 318/254.1 |
| 7,759,884 B2 * | 7/2010 | Dufner | ................... | H02P 6/002 318/400.01 |
| 7,773,352 B2 * | 8/2010 | Mishima | .................. | H02P 6/14 318/432 |
| 7,885,044 B2 * | 2/2011 | Mishima | .................. | H02P 6/14 318/400.38 |
| 8,274,249 B2 * | 9/2012 | Mishima | .................. | H02P 6/14 318/400.21 |
| 8,278,853 B2 * | 10/2012 | Kitagawa | .................. | H02P 6/16 318/400.13 |
| 8,310,188 B2 * | 11/2012 | Nakai | ..................... | H02P 6/085 318/400.06 |
| 8,610,385 B2 * | 12/2013 | Sakaguchi | ............... | H02P 6/008 318/400.1 |
| 2004/0160204 A1 * | 8/2004 | Schondelmaier | ......... | H02P 6/14 318/400.01 |
| 2005/0001569 A1 * | 1/2005 | Yamamoto | ................ | H02P 6/16 318/400.17 |
| 2006/0267531 A1 * | 11/2006 | Hahn | ...................... | H02P 6/002 318/400.04 |
| 2007/0189739 A1 * | 8/2007 | Dufner | ................... | H02P 6/142 388/801 |
| 2008/0219648 A1 * | 9/2008 | Liu | .......................... | H02P 6/16 388/811 |
| 2008/0252239 A1 * | 10/2008 | Lin | .......................... | H02P 6/08 318/400.06 |
| 2008/0252245 A1 * | 10/2008 | Chen | ........................ | H02P 6/16 318/434 |
| 2008/0315808 A1 * | 12/2008 | Mishima | .................. | H02P 6/14 318/400.21 |
| 2010/0026219 A1 * | 2/2010 | Nakai | ..................... | H02P 6/085 318/400.11 |
| 2010/0264862 A1 * | 10/2010 | Kitagawa | .................. | H02P 6/16 318/400.13 |
| 2010/0264866 A1 * | 10/2010 | Mishima | .................. | H02P 6/14 318/400.21 |
| 2011/0089878 A1 * | 4/2011 | Mishima | .................. | H02P 6/14 318/447 |
| 2012/0217907 A1 * | 8/2012 | Sakaguchi | ............... | H02P 6/205 318/400.1 |
| 2012/0326643 A1 * | 12/2012 | Brannen | .................. | H02P 6/18 318/400.11 |
| 2013/0175957 A1 * | 7/2013 | Ishikawa | .................. | H02P 6/06 318/400.23 |
| 2014/0062355 A1 | 3/2014 | Wang et al. | | |

FOREIGN PATENT DOCUMENTS

| | | |
|---|---|---|
| JP | 2012-185106 A | 9/2012 |
| KR | 10-1228665 B1 | 1/2013 |
| KR | 10-2013-0072659 | 7/2013 |
| KR | 10-1293082 B1 | 8/2013 |
| KR | 10-2013-0114455 A | 10/2013 |

* cited by examiner

SYSTEM AND METHOD FOR COMPUTING MOTOR SPEED AND ROTOR POSITION USING HALL SENSOR

CROSS-REFERENCE TO RELATED APPLICATION

This application claims under 35 U.S.C. §119(a) the benefit of Korean Patent Application No. 10-2014-0128036 filed on Sep. 25, 2014, the entire contents of which are incorporated herein by reference.

BACKGROUND (a) Technical Field

The present disclosure relates to a system and method for computing a motor speed and a rotor position using a hall sensor. More particularly, it relates to a method for computing a motor speed and a rotor position using a hall sensor, to enhance precision for computing the speed of the motor rotating at a high speed and a rotor position of the motor using the hall sensor.

(b) Background Art

Environmentally-friendly vehicles such as a fuel cell vehicle, an electric vehicle, a hybrid vehicle, and a plug-in electric vehicle include a plurality of motors for generating power and driving a vehicle and a hall sensor for detecting revolutions per minute (RPM) of each motor to more precisely control driving of the motors.

The hall sensors are mounted at predetermined angle intervals at a predetermined position of each motor and each hall sensor may be configured to generate on or off digital signals based on a rotation of a rotor of the motor to output position information of the rotor and perform a series of motor driving controls (e.g., computation of a motor speed, and the like) based on the position information. In particular, the typical method for computing a motor speed using a hall sensor will be described with reference to the accompanying FIGS. 1 and 2. A motor controller is configured to determine a time until the signal of the hall sensor is changed from high to low or from low to high, at a predetermined time interval, which is referred to as $T_c$.

Referring to FIG. 1, for example, when the change in the signal of the hall sensor is sensed at only m-th, the time when the signal is sensed becomes $mT_c$ and the motor speed is computed by the following Equation 1.

$$모터속도 (Motor\ Speed) = \frac{1}{N \times m \times T_c} [rev/s] \quad \text{Equation 1}$$

In the above Equation 1, m represents a period of change in the signal of the hall sensor, that is, the time until the signal of the hall sensor is changed from high to low or from low to high, $T_c$ represents the predetermined time interval for confirming the signal of the hall sensor, and N represents the number of poles of the motor.

However, the typical method for computing a motor speed using a hall sensor has the following problems.

First, errors may occur during the calculation of the motor speed and the rotor position. As illustrated in FIG. 1, an error of $\Delta T_1 - \Delta T_2$ occurs between a time $T_{real}$ when a sensing value of the hall sensor is actually changed and a measured time $mT_c$ as in the following Equation 2, such that errors occur in the computation of the motor speed.

$$T_{real} = mT_c + \Delta T_1 - \Delta T_2$$

$$T_{real} - mT_c = \Delta T_1 - \Delta T_2 \quad \text{Equation 2}$$

Further, a position value of the rotor is confirmed based on a timing when the sensing value of the hall sensor is changed from low to high as in timing ① of FIG. 1. However, at the timing ①, there occurs a time error called $\Delta T_1$ between the time when the sensing value of the hall sensor is actually changed and the time when the controller senses the change in the sensing value of the hall sensor and similarly, a time error called $\Delta T_2$ occurs even at a time ② of FIG. 1, such that errors occur during the calculation of the rotor position.

Second, the following problems may occur due to the occurrence of errors during the calculation of the motor speed and the rotor position.

1) The computation errors of the motor speed may cause errors of a measurement value of a feedback speed used in a speed controller among configurations of the motor controller illustrated in FIG. 2, and thus an output current command value of the speed controller may fluctuate.

2) The computation errors of the rotor position may cause errors of the position value of the rotor used in a current controller, and therefore a ripple may occur in a current supplied to a 3-phase motor, such that the speed control may be unstable.

3) The instability of motor speed and current control may occur and control efficiency of the motor and the inverter may be degraded, due to the occurrence of errors during the computation of the motor speed and the rotor position, and heat generation of the motor may be promoted due to the degradation of the motor efficiency, and thus cooling performance may also be degraded.

Third, as the time interval $T_c$ confirming the signal of the hall sensor decreases, the computation errors of the motor speed and the rotor position may be reduced, but a computation load of a CPU of the motor controller may be increased.

Generally, since the motor controller uses a switching frequency from several kHz to tens of kHz, the motor controller is configured to perform a complex computation involved in the motor control for a time of about 100 µs to determine a pulse width modulation (PWM) duty, and therefore the computation load is substantial. Therefore, it may be impossible to make the signal confirming period of the hall sensor infinitely short due to restrictions of the computation load of the motor controller.

Fourth, considering that the rotation speed of the motor used in a compressor for air supply of the fuel cell vehicle is increased as specifications of air supply pressure are increased, such that the motor is driven from tens of hundreds of RPM to hundreds of thousands of RPM, the occurrence of errors during the calculation of the motor speed and the rotor position using the hall sensor may cause the degradation in fuel efficiency and power performance of a fuel cell vehicle.

Meanwhile, to more accurately compute the motor speed and the rotor position, instead of the hall sensor, a resolver sensor may be used, but the resolver sensor is more expensive than the hall sensor and has a disadvantage in terms of a package for mounting the resolver sensor and thus is rarely used for other components other than a driving motor of the fuel cell vehicle.

The above information disclosed in this section is merely for enhancement of understanding of the background of the invention and therefore it may contain information that does not form the prior art that is already known in this country to a person of ordinary skill in the art.

SUMMARY

The present invention provides a system and method for computing a motor speed and a rotor position using a hall sensor, to improve precision for computing the speed of the motor rotating at a substantially high speed and the rotor position using the hall sensor based on configurations, such as the hall sensor mounted within the motor as a position sensor, a motor controller configured to receive a signal of the hall sensor to operate the motor, and a microcomputer configured to store a time when the motor controller senses the timing of a change in the signal of the hall sensor.

In one aspect, the present invention provides a method for computing a motor speed and a rotor position using a hall sensor that may include: determining whether a signal value of the hall sensor is changed; calculating a time $T_{current}$ when a computation for determining a PWM switching duty starts and a time $T_{Hall}$ at a point at which the signal value of the hall sensor is changed by reading an internal clock counter value of a central processing unit (CPU) disposed within an inverter controller, when the signal value of the hall sensor is changed; calculating a motor speed $\omega_r$ based on the time information $T_{Hall}$ when a signal value of the hall sensor is changed at a previous time which is closest to a current time and time information $T_{Hall\_old}$ which represents the old $T_{Hall}$ value; and calculting a rotor position based on a time difference $\Delta T$ between the $T_{Current}$ and the $T_{Hall}$.

In an exemplary embodiment, the calculation of the current time may be performed when the computation for determining the PWM switching duty starts between the timing when the signal value of the hall sensor is changed and the timing when a next signal value of the hall sensor is changed. In addition, a microcomputer disposed within the inverter controller may be configured to generate an event triggered by a change in the signal of the hall sensor prior to the signal value determination process and the internal clock counter value of the CPU may be automatically recorded in a specific memory of the microcomputer as a value for measuring the $T_{Hall}$ at the point at which the signal value of the hall sensor is changed, based on the generated event.

By the above configuration, the present invention has the following effects.

First, it may be possible to more accurately compute the speed of the motor rotating at a high speed using the hall sensor.

Second, it may be possible to improve control efficiency of the motor by more accurately computing the rotor position of the motor using the hall sensor.

Third, it may be possible to realize cost saving by more precisely computing the rotor position and measuring the motor speed while using an inexpensive hall sensor as compared to using an expensive resolver.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
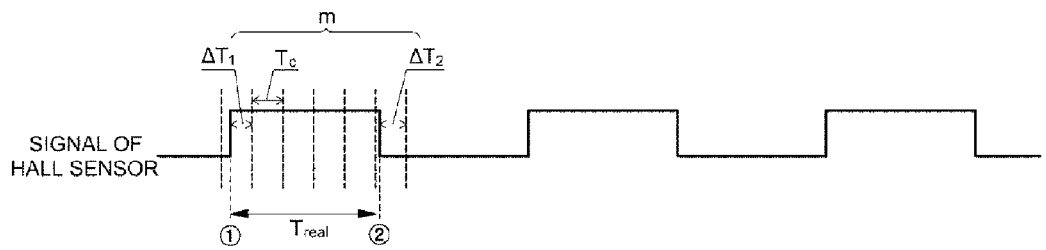
FIG. 1 is an exemplary diagram illustrating a method for measuring a motor speed using a hall sensor according to the related art.
Figure 2:
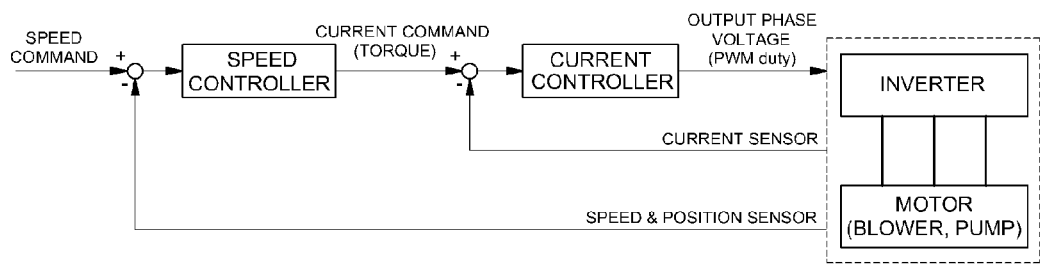
FIG. 2 is an exemplary diagram illustrating a motor controller including a speed controller and a current controller according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
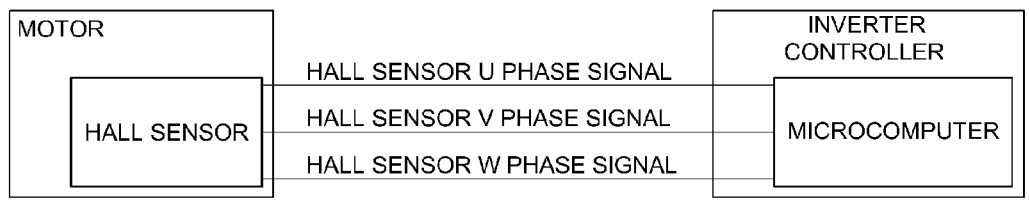
FIG. 3 is an exemplary configuration diagram illustrating a method for computing a motor speed and a rotor position using a hall sensor according to an exemplary embodiment of the present invention.

Hereinafter, exemplary embodiments of the present invention will be described in detail with reference to the accompanying drawings. FIG. 3 is an exemplary configuration diagram illustrating a method for computing a motor speed and a rotor position using a hall sensor according to an exemplary embodiment of the present invention.

FIG. 3 illustrates an exemplary configuration of the method for computing a motor speed and a rotor position using a hall sensor according to an exemplary embodiment of the present invention, in which the configuration may include a hall sensor mounted within the motor as a position sensor, an inverter controller (e.g., a motor controller) configured to receive a signal of the hall sensor to operate the motor, a microcomputer within the inverter controller connected to the hall sensor via a 3-phase signal line to sense a change in a signal of the hall sensor, and the like.

Figure 4:
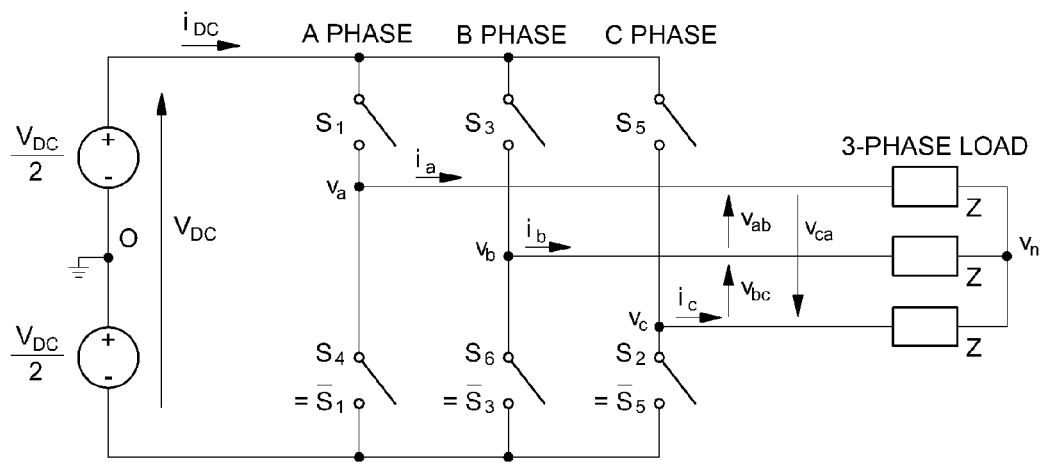
FIG. 4 is an exemplary diagram illustrating an example of a 3-phase switching circuit within an inverter controller according to an exemplary embodiment of the present invention.

As illustrated in FIG. 4, the inverter controller may include a 3-phase switching circuit configured to adjust a 3-phase output and perform a PWM duty control on six switches S1 to S6 within the 3-phase switching circuit based on a frequency of several kHz to tens of kHz to perform a current control for operating a motor output.

The inverter controller may be configured to execute various computations (e.g., computing a rotor position and a motor speed, sensing a 3-phase current, adjusting a current, determining a next 3-phase voltage output value, and determining a next PWM duty, and the like) required to determine the PWM duty at each update period $T_{PWM}$ of the PWM duty determined by a switching frequency of the 3-phase switching circuit. In particular, for the current controller disposed within the inverter controller to more accurately control a current, further information is required regarding the accurate rotor position and motor speed at each PWM duty period. The method for computing a motor speed and a rotor position using a hall sensor according to the exemplary embodiment of the present invention having the above configuration will be described below in detail.

Figure 5:
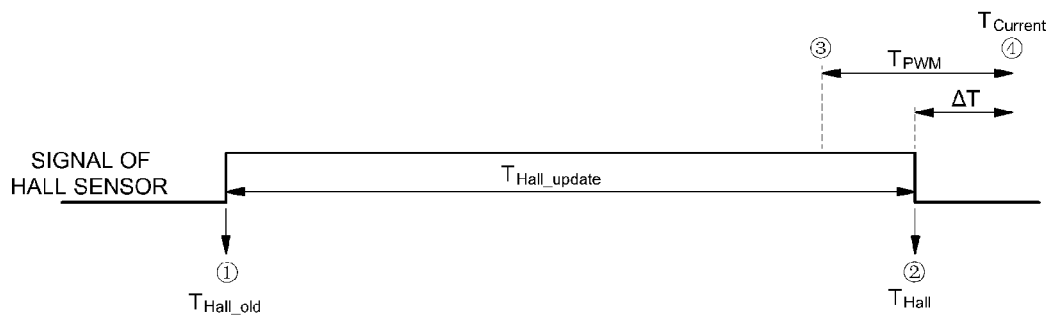
FIG. 5 is an exemplary diagram illustrating the method for computing a motor speed and a rotor position using a hall sensor according to an exemplary embodiment of the present invention.

FIG. 5 is an exemplary diagram illustrating the method for measuring a motor speed using a hall sensor according to the exemplary embodiment of the present invention. In particular, references ③ and ④ illustrated in FIG. 5 represent a time when the computation of the current controller for determining the PWM duty in the next step starts, and a time between ① and ② represents a time $T_{Hall\_update}$ required for a signal value of the hall sensor to be changed.

According to the exemplary embodiment of the present invention, when the signal value of the hall sensor is changed as in ① or ② illustrated in FIG. 5, the microcomputer (e.g., the controller) may be configured to generate an event triggered by the change in the signal of the hall sensor, and an internal clock counter value of the CPU configured to measure time information when the signal value of the hall sensor is changed, that is, a time $T_{Hall}$ at a point at which the signal value of the hall sensor is changed, based on the generated event, may be automatically recorded in a specific memory of the microcomputer.

As the internal clock counter value of the CPU for measuring the time information $T_{hall}$ when the signal value of the hall sensor is changed is automatically recorded in a specific memory of the microcomputer, it may be possible to more accurately determine the time information when the signal value of the hall sensor is changed, unlike the related art.

Similar to a timing ④ illustrated in FIG. 5, when the signal value of the hall sensor is changed after a computation timing ③ just before the timing ④, the time information at the timing ④, that is, a time $T_{current}$ when the computation for determining the PWM switching duty starts may be determined by reading the internal clock counter value of the CPU. During the calculation at the timing ④, the rotation speed of the motor may be computed based on the time information $T_{Hall}$ when a signal value of the hall sensor is changed at a previous time which is closest to a current time and the time information $T_{Hall\_old}$ which represents the old $T_{Hall}$ value and the more accurate rotor position information at the timing ④ may be computed based on a time difference $\Delta T$ between the $T_{Current}$ and the $T_{Hall}$.

Figure 6:
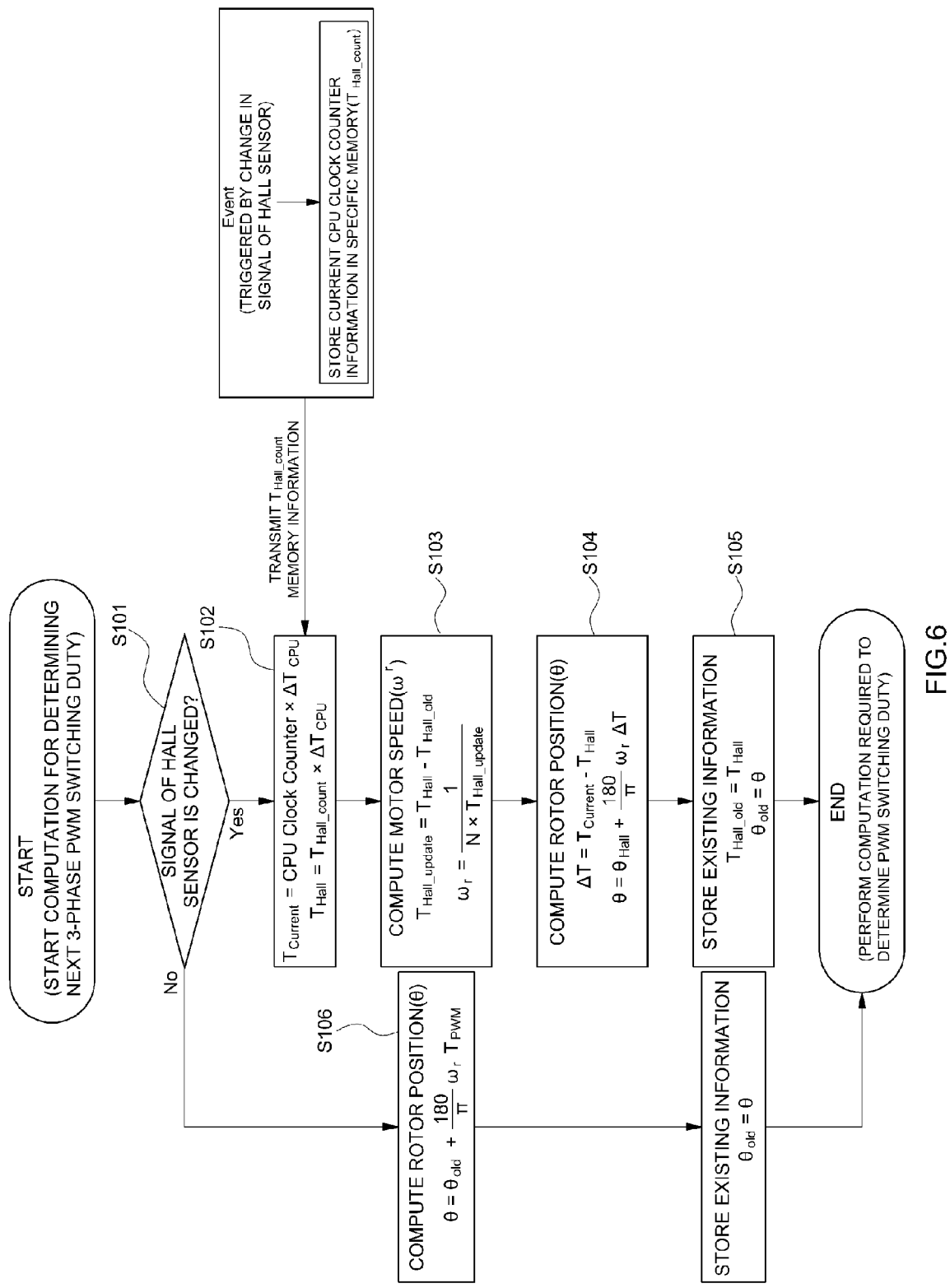
FIG. 6 is an exemplary flow chart illustrating the method for computing a motor speed and a rotor position using a hall sensor according to the exemplary embodiment of the present invention.

For reference, the CPU clock counter may have a time resolution as much as performance of the CPU. In particular, since the CPU used for a motor control holds performance of at least several kHz or greater, a time computation may be performed at a resolution of about 100 ns or greater, and thus the speed of the motor rotating at hundreds of thousands of rpm or greater and the rotor position may also be more accurately computed. One exemplary embodiment of the method for computing a motor speed and a rotor position using a hall sensor according to the present invention will be described with reference to FIGS. 5 and 6.

As described above, the microcomputer may be configured to generate the event triggered by the change in the signal value of the hall sensor, and whether a next signal value of the hall sensor is changed may be determined when the internal clock counter value of the CPU for measuring the time information when the signal value of the hall sensor is changed, that is, the time $T_{Hall}$ at the point at which the signal value of the hall sensor is changed, based on the generated event may be automatically recorded in the specific memory of the microcomputer (S101). For example, as illustrated in FIG. 5, in response to determining whether the next signal value of the hall sensor is changed when the internal clock counter value of the CPU is automatically recorded at the timing ①, the timing ② may be a timing when the next signal value of the hall sensor is changed.

In particular, when the information regarding the more accurate rotor position and motor speed is measured at each PWM duty period, when, similar to the timing ②, between the PWM duty periods between ③ and ④ of FIG. 5, the timing when the signal of the hall sensor is changed is present, the computation of the motor speed and the rotor position at the timing ③ may be the same as computation at the timing ① and the computation of the motor speed and the rotor position at the timing ④ after the timing ② which is the timing when the signal of the hall sensor is changed may be newly performed.

Accordingly, when the signal value of the hall sensor is changed before the timing ④ and after the timing ③ which are illustrated in FIG. 5, to compute the motor speed and the rotor position at the timing ④, the time information at the timing ④, that is, the time $T_{current}$ when the computation for determining the PWM switching duty starts may be computed based on the following Equation 3 by reading the internal clock counter value of the CPU, and the time $T_{Hall}$ at the point at which the signal value of the hall sensor is changed may also be computed based on the following Equation 4 by reading the internal clock counter value of the CPU (S102).

$$T_{Current} = \text{CPU Clock Counter} \times \Delta T_{CPU} \quad \text{Equation 3}$$

In the above Equation 3, a CPU clock counter represents a CPU internal clock counter to find out timing when an operation to determine a PWM switching duty starts, and $\Delta T_{CPU}$ represents a time when the CPU clock counter is increased by one.

$$T_{Hall} = T_{Hall\_count} \times \Delta T_{CPU} \quad \text{Equation 4}$$

In the above Equation 4, $T_{Hall\_count}$ represents the internal clock counter value of the CPU which is automatically stored in the specific memory of the microcomputer, as the time information, based on the event, when the signal value of the hall sensor is changed, as described above, and the $\Delta T_{CPU}$ represents the time when the CPU clock counter is increased by one.

Furthermore, the calculation of the motor speed and the rotor position at a specific timing after the signal value of the hall sensor is changed, for example, the timing ④ may be sequentially progressed (S103 and S104). The motor speed $\omega_r$ may be computed based on the time information $T_{Hall}$ when the signal value of the hall sensor is changed at a previous time which is closest to a current time and the time information $T_{Hall\_old}$ which represents the old $T_{Hall}$ value. The motor speed may be computed at the timing (e.g., the timing ④ in FIG. 5) when the computation for determining the PWM switching duty starts between the timing when the signal value of the hall sensor is changed and the timing when a next signal value of the hall sensor is changed.

For example, as illustrated in FIG. 5, at the time of computing the motor speed at the timing ④, the motor speed may be computed based on the following Equation 5 using the time information $T_{Hall}$ when the signal value of the hall sensor is changed at a previous time which is closest to a current time and the time information $T_{Hall\_old}$ which represents the old $T_{Hall}$ value.

$$\omega_r = \frac{1}{N \times T_{Hall\_update}} \quad \text{Equation 5}$$

In the above Equation 5, $T_{Hall\_update}$ represents the difference between the time $T_{Hall}$ when the previous signal value of the hall sensor is changed and the time $T_{Hall\_old}$ when the signal value of the hall sensor following the previous signal value is changed, that is, the time required for the signal value of the hall sensor to be changed, and N represents the number of poles of the motor.

A rotor position θ of the motor may be computed based on the following Equation 6 using the time difference ΔT between $T_{Current}$ and $T_{Hall}$. Similarly, the rotor position of the motor may be computed at a specific timing (e.g., the timing ④ in FIG. 5) when the PWM switching duty is present between the timing when the signal value of the hall sensor is changed and the timing when the next signal value of the hall sensor is changed.

$$\theta = \theta_{Hall} + \frac{180}{\pi} \omega_r \Delta T \quad \text{Equation 6}$$

In the above Equation 6, $\theta_{Hall}$ represents an electrical position (angle) when a positon of the hall sensor determined by a position of a motor where the hall sensor is physically mounted is changed, and ΔT represents the time difference between $T_{Current}$ and $T_{Hall}$. When the computation of the motor speed and the rotor position ends, $T_{Hall}$ may be stored as $T_{Hall\_old}$ and θ may be stored as $\theta_{Hall}$ (S105), which may be used to compute the motor speed and the rotor position during the calculation used to determine the next PWM switching duty. In particular, when there is no change in the signal of the hall sensor, the computation of the rotor position may be computed to meet the PWM period $T_{PWM}$ (S106).

Figure 7:
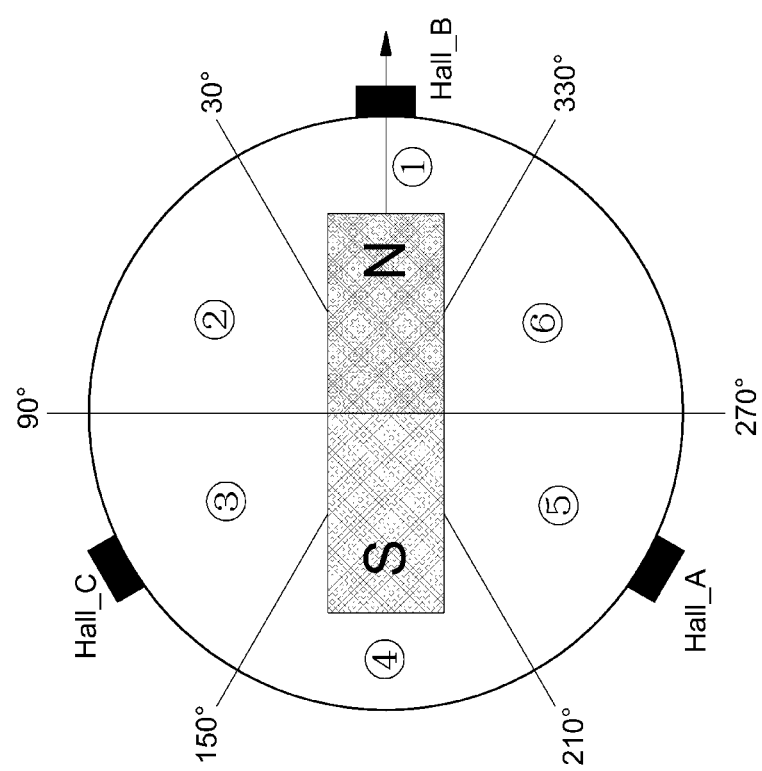
FIGS. 7 and 8 are exemplary diagrams illustrating an example of a change in a signal value of the hall sensor based on a mounting position of the hall sensor and the rotor position according to an exemplary embodiment of the present invention.
Figure 8:
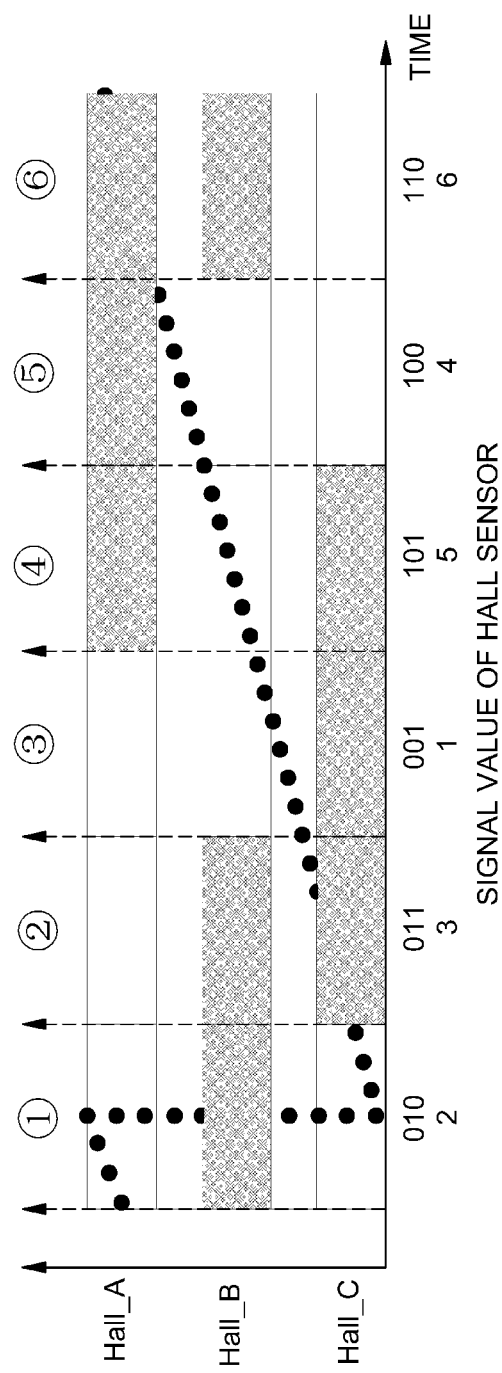

Meanwhile, for the system in which the change in the motor speed is severe, the motor speed may be rapidly updated. Referring to FIGS. 7 and 8, for general calculation of the rotor position and the motor speed using the hall sensor, since three hall sensors may be installed in the motor at an interval of about 120°, the change in the signal value of the hall sensor may be sensed at an interval of about 60° when three hall sensors are combined. Therefore, for storing the CPU clock counter information and computing the motor speed whenever the signal value of the hall sensor is changed at an interval of about 60° like the above-mentioned method, a speed value reflecting closer to the current speed may be computed.

A substantially low signal and a substantially high signal of the hall sensor appear at a more accurate interval of about 180°, but may have an error of 180°±α due to a manufacturing error of the motor, and therefore errors may occur even during the calculation of the motor speed and the rotor position. Therefore, when the motor is driven at a substantially constant speed and thus no high-speed update is required, to more accurately compute the motor speed and the rotor position, the computation may be continuously performed at one of the timings when the signal of the hall sensor is changed to the low-high and the timing when the signal of the hall sensor is changed to the high-low.

Figure 9:
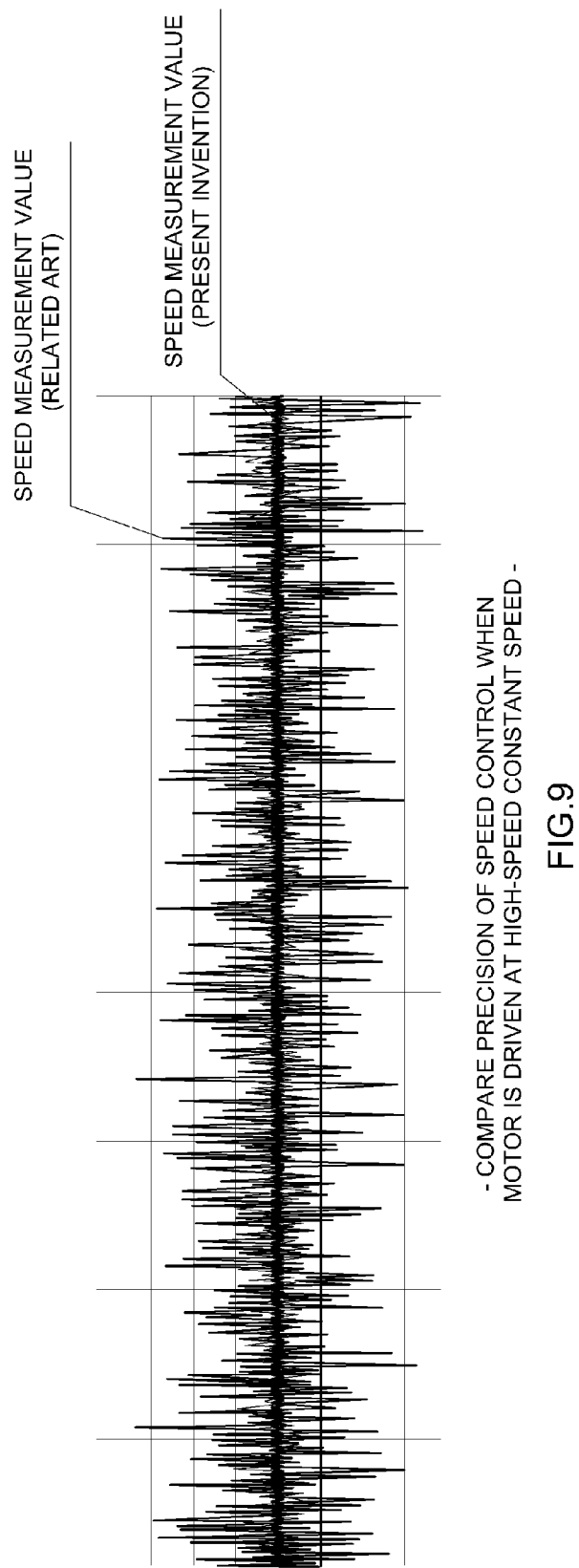
FIGS. 9 and 10 are exemplary graphs illustrating a comparison of results of experimental examples of the method for computing a motor speed and a rotor position using a hall sensor according to the exemplary embodiment of the present invention with the existing method.

The result, which may be obtained by comparing and measuring the precision of the speed control when the motor is operated at the high-speed substantially constant speed and the 3-phase current when the motor is operated at the high-speed substantially constant speed when the method for computing a motor speed and a rotor position using a hall sensor according to the present invention is applied with when the method for computing a motor speed and a rotor position using a hall sensor according to the related art is applied, is illustrated in FIGS. 8 and 9.

Figure 10:
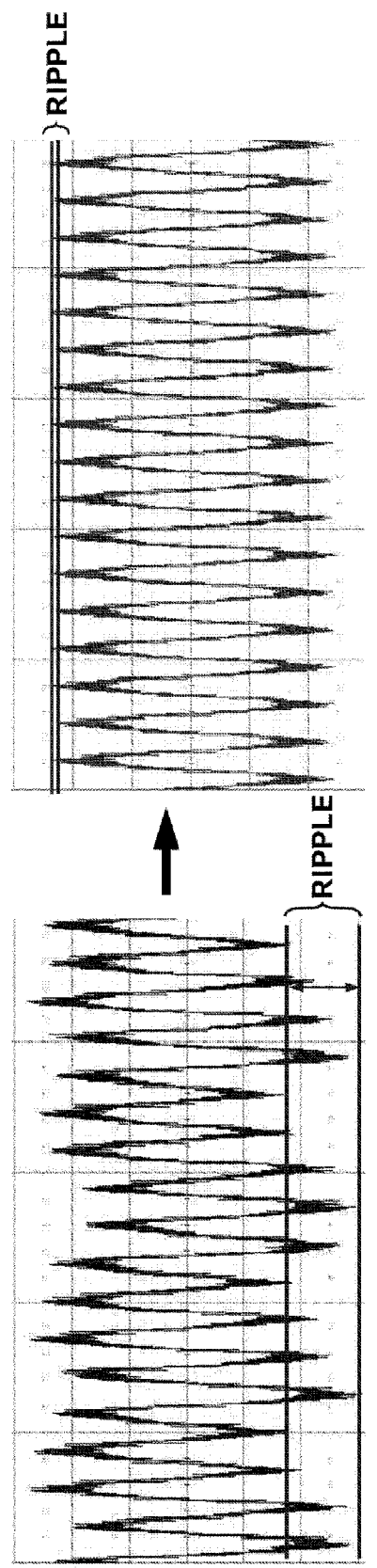

As illustrated in FIG. 9, it may be appreciated that the speed measurement value according to the present invention is more precise by substantially reducing the error rate compared with the related art. As illustrated in FIG. 10, it may be appreciated that the present invention may reduce the 3-phase current control ripple to about 90% or greater.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for computing a motor speed of a motor and a rotor position of the motor using a hall sensor, comprising:
    determining, by an inverter controller having installed therein a microcomputer which includes a memory configured to store program instruction and a central processing unit (CPU) configured to execute the program instructions, whether a signal value of the hall sensor is changed;
    after determining that the signal value of the hall sensor is changed, computing, by the inverter controller, a time $T_{current}$ at a point which a computation for determining a pulse width modulation (PWM) switching duty starts and a time $T_{Hall}$ at a point at which the signal value of the hall sensor is changed by reading an internal clock counter value according to a CPU clock counter of the CPU of the inverter controller;
    computing, by the inverter controller, a motor speed $\omega_r$ based on a time difference between $T_{Hall}$ which is closest to a current time and a time $T_{Hall\_old}$ which represents the old $T_{Hall}$ value; and
    computing, by the inverter controller, a rotor position based on a time difference $\Delta T$ between the $T_{Current}$ and the $T_{Hall}$;
    wherein the hall sensor is mounted within the motor as a position sensor, the inverter controller is configured to receive a signal of the hall sensor to operate the motor, and the microcomputer is configured to store a time at which point the inverter controller senses the change in the signal value of the hall sensor.

2. The method of claim 1, wherein the time computation for determining the start of the PWM switching duty is performed when the computation for determining the PWM switching duty starts between the timing when the signal value of the hall sensor is changed and the timing when a next signal value of the hall sensor is changed.

3. The method of claim 1, further comprising:
    generating, by the controller, an event triggered by a change in the signal of the hall, and the internal clock counter value of the CPU is automatically recorded in a specific memory of the controller as a value for measuring the $T_{Hall}$ at the point at which the signal value of the hall sensor is changed, based on the generated event.

4. The method of claim 1, wherein the time $T_{current}$ when the computation for determining the PWM switching duty starts is computed based on $T_{Current}$=CPU Clock Counter×$\Delta T_{CPU}$ by reading the internal clock counter value of the CPU,
    wherein, a CPU clock counter represents a CPU internal clock counter to determine timing when an operation to determine a PWM switching duty starts, and $\Delta T_{CPU}$ represents a time when the CPU clock counter is increased by one.

5. The method of claim 1, wherein the time $T_{Hall}$ at the point at which the signal value of the hall sensor is changed is computed based on $T_{Hall}=T_{Hall\_count}\times\Delta T_{CPU}$ by reading the internal clock counter value of the CPU,
    wherein, $T_{Hall\_count}$ represents the internal clock counter value of the CPU which is automatically stored in the specific memory of the controller, as the time information when the signal value of the hall sensor is changed, and the $\Delta T_{CPU}$ represents the time when the CPU clock counter is increased by one.

6. The method of claim 1, wherein the motor speed $\omega_r$ is computed based on $$\omega_r = \frac{1}{N \times T_{Hall\_update}}$$

at the timing when the computation for determining the PWM switching duty between the timing when the signal value of the hall sensor is changed and the timing when a next signal value of the hall sensor is changed is performed,
    wherein, $T_{Hall\_update}$ represents the difference between the time $T_{Hall}$ when a signal value of the hall sensor is changed at a previous time which is closest to a current time, the time $T_{Hall\_old}$ which represents the time required for the signal value of the hall sensor to be changed, and N represents the number of poles of the motor.

7. The method of claim 1, wherein the rotor position of the motor is computed based on $$\theta = \theta_{Hall} + \frac{180}{\pi}\omega_r \Delta T$$

at the timing when the computation for determining the PWM switching duty between the timing when the signal value of the hall sensor is changed and the timing when a next signal value of the hall sensor is changed is performed,
    wherein, $\theta_{Hall}$ represents an electrical position when a position of the hall sensor determined by a position of a motor where the hall sensor is physically mounted is changed, and $\Delta T$ represents the time difference between $T_{Current}$ and $T_{Hall}$.

8. A system for computing a motor speed of a motor and a rotor position of the motor using a hall sensor, comprising:
    an inverter controller having installed therein a microcomputer which includes a memory configured to store program instructions and a processor configured to execute the program instructions, which executed cause the processor to:
    determine whether a signal value of the hall sensor is changed;
    after determining that the signal value of the hall sensor is changed, compute a time $T_{current}$ at a point which a computation for determining a pulse width modulation (PWM) switching duty starts and a time $T_{Hall}$ at a point at which the signal value of the hall sensor is changed by reading an internal clock counter value according to a CPU clock counter of the processor of the inverter controller;
    compute a motor speed $\omega_r$ based on a time difference between $T_{Hall}$ which is closest to a current time and $T_{Hall\_old}$ which represents the old $T_{Hall}$ value; and
    compute a rotor position based on a time difference $\Delta T$ between the $T_{current}$ and the $T_{Hall}$;

wherein the hall sensor is mounted within the motor as a position sensor, the inverter controller is configured to receive a signal of the hall sensor to operate the motor, and the microcomputer is configured to store a time at which point the inverter controller sense the change in the signal value of the hall sensor.

9. The system of claim 8, wherein the time computation for determining the start of the PWM switching duty is performed when the computation for determining the PWM switching duty starts between the timing when the signal value of the hall sensor is changed and the timing when a next signal value of the hall sensor is changed.

10. The system of claim 8, wherein the program instructions when executed are further configured to:
generate an event triggered by a change in the signal of the hall, and the internal clock counter value of the CPU is automatically recorded in a specific memory of the controller as a value for measuring the $T_{Hall}$ at the point at which the signal value of the hall sensor is changed, based on the generated event.

11. The system of claim 8, wherein the time $T_{current}$ when the computation for determining the PWM switching duty starts is computed based on $T_{current}$=CPU Clock Counter× $\Delta T_{CPU}$ by reading the internal clock counter value of the CPU,
wherein, a CPU clock counter represents a CPU internal clock counter to determine timing when an operation to determine a PWM switching duty starts, and $\Delta T_{CPU}$ represents a time when the CPU clock counter is increased by one.

12. The system of claim 8, wherein the time $T_{Hall}$ at the point at which the signal value of the hall sensor is changed is computed based on $T_{Hall}=T_{Hall\_count}\times\Delta T_{CPU}$ by reading the internal clock counter value of the CPU,
wherein, $T_{Hall\_count}$ represents the internal clock counter value of the CPU which is automatically stored in the specific memory of the controller, as the time information when the signal value of the hall sensor is changed, and the $\Delta T_{CPU}$ represents the time when the CPU clock counter is increased by one.

13. The system of claim 8, wherein the motor speed $\omega_r$ is computed based on $$\omega_r = \frac{1}{N \times T_{Hall\_update}}$$

at the timing when the computation for determining the PWM switching duty between the timing when the signal value of the hall sensor is changed and the timing when a next signal value of the hall sensor is changed is performed,
wherein, $T_{Hall\_update}$ represents the difference between the time $T_{hall}$ when a signal value of the hall sensor is changed at a previous time which is closest to a current time, the time $T_{Hall\_old}$ which represents the time required for the signal value of the hall sensor to be changed, and N represents the number of poles of the motor.

14. The system of claim 8, wherein the rotor position of the motor is computed based on $$\theta = \theta_{Hall} + \frac{180}{\pi}\omega_r \Delta T$$

at the timing when the computation for determining the PWM switching duty between the timing when the signal value of the hall sensor is changed and the timing when a next signal value of the hall sensor is changed is performed,
wherein, $\theta_{Hall}$ represents an electrical position when a position of the hall sensor determined by a position of a motor where the hall sensor is physically mounted is changed, and $\Delta T$ represents the time difference between $T_{current}$ and $T_{Hall}$.

15. A non-transitory computer readable medium containing program instructions for computing a motor speed of a motor and a rotor position of the motor using a hall sensor, the program instruction being executed by an inverter controller having installed therein a microcomputer which includes a memory and a processor, the computer readable medium comprising:
program instructions that determine whether a signal value of the hall sensor is changed;
program instructions that compute, after determining that the signal value of the hall sensor is changed, a time $T_{current}$ at which point a computation for determining a pulse width modulation (PWM) switching duty starts and a time $T_{Hall}$ at a point at which the signal value of the hall sensor is changed by reading an internal clock counter value according to a CPU clock counter of the processor of the inverter controller;
program instructions that compute a motor speed $\omega_r$ based on a time difference between $T_{Hall}$ which is closest to a current time and a time $T_{Hall\_old}$ which represents the old $T_{Hall}$ value; and
program instructions that compute a rotor position based on a time difference $\Delta T$ between the $T_{Current}$ and the $T_{Hall}$;
wherein the hall sensor is mounted within the motor as a position sensor, the inverter controller is configured to receive a signal of the hall sensor to a operate the motor, and the microcomputer is configured to store a time at which point the inverter controller senses the change in the signal value of the hall sensor.

16. The non-transitory computer readable medium of claim 15, wherein the time computation for determining the start of the PWM switching duty is performed when the computation for determining the PWM switching duty starts between the timing when the signal value of the hall sensor is changed and the timing when a next signal value of the hall sensor is changed.

17. The non-transitory computer readable medium of claim 15, further comprising:
program instructions that generate an event triggered by a change in the signal of the hall, and the internal clock counter value of the CPU is automatically recorded in a specific memory of the controller as a value for measuring the $T_{Hall}$ at the point at which the signal value of the hall sensor is changed, based on the generated event.

18. The non-transitory computer readable medium of claim 15, when the computation for determining the PWM switching duty starts is computed based on $T_{Current}$=CPU Clock Counter× $\Delta T_{CPU}$ by reading the internal clock counter value of the CPU,
wherein, a CPU clock counter represents a CPU internal clock counter to determine timing when an operation to determine a PWM switching duty starts, and $\Delta T_{CPU}$ represents a time when the CPU clock counter is increased by one.

19. The non-transitory computer readable medium of claim 15, wherein the time $T_{Hall}$ at the point at which the signal value of the hall sensor is changed is computed based on $T_{Hall}=T_{Hall\_count} \times \Delta T_{CPU}$ by reading the internal clock counter value of the CPU, wherein, $T_{Hall\_count}$ represents the internal clock counter value of the CPU which is automatically stored in the specific memory of the controller, as the time information when the signal value of the hall sensor is changed, and the $\Delta T_{CPU}$ represents the time when the CPU clock counter is increased by one.

* * * * *